United States Patent [19]
Poo et al.

[11] Patent Number: 5,472,747
[45] Date of Patent: Dec. 5, 1995

[54] METHOD AND APPARATUS FOR TREATING A POLYOLEFIN SURFACE TO OBTAIN AN ACTIVE SURFACE WHICH IS RECEPTIVE TO INKS AND ADHESIVES

[76] Inventors: Ramon E. Poo; Faustino Poo, both of 3225 NW. 112 St., Miami, Fla. 33167-3310

[21] Appl. No.: 156,882

[22] Filed: Nov. 23, 1993

[51] Int. Cl.$^6$ .............................. B05D 3/06; B05C 13/00
[52] U.S. Cl. ..................... 427/536; 427/539; 427/533; 427/8; 118/500; 198/374; 198/383; 198/385; 198/410
[58] Field of Search ................... 427/533, 534, 427/535, 536, 539, 540, 569, 580, 477, 478, 479, 480, 481, 207.1, 208.8, 242, 301, 322, 324, 8; 118/500, 620; 204/131, 156, 165, 192.14, 298.15, 298.23, 298.24, 298.27, 298.25; 156/643, 362, 363, 380.6, 536, 574, 577; 198/374, 383, 385, 394, 410, 416, 417

[56] References Cited

U.S. PATENT DOCUMENTS

| | | | |
|---|---|---|---|
| 2,555,519 | 6/1951 | Tolle et al. | 427/477 |
| 2,775,334 | 12/1956 | Jeremiah | 198/383 |
| 2,998,324 | 8/1961 | Hirt | 427/322 |
| 3,042,971 | 7/1962 | Wolinski | 427/322 |
| 3,161,702 | 12/1964 | Howington | 427/322 |
| 3,313,642 | 4/1967 | Waugh | 427/444 |
| 3,326,742 | 6/1967 | Shepherd | 427/322 |
| 3,347,695 | 10/1967 | Stancell et al. | 427/322 |
| 3,361,246 | 1/1968 | Kukawski | 198/394 |
| 3,361,418 | 1/1968 | Fromont et al. | 198/416 |
| 3,367,534 | 2/1968 | Carter, III | 198/416 |
| 3,369,982 | 2/1968 | Wood | 427/322 |
| 3,376,208 | 4/1968 | Wood | 427/322 |
| 3,484,363 | 12/1969 | Williams | 204/168 |
| 3,674,536 | 7/1972 | Khelghatian | 427/322 |
| 3,726,387 | 4/1973 | Krooss | 198/416 |
| 3,786,908 | 1/1974 | Jones | 198/416 |
| 3,831,738 | 8/1974 | Aidlin et al. | 198/416 |
| 3,904,930 | 9/1975 | Waldron et al. | 427/481 |
| 3,916,063 | 10/1975 | Dratz et al. | 427/322 |
| 3,954,171 | 5/1976 | Chick et al. | 198/394 |
| 3,993,187 | 11/1976 | Knez | 198/416 |
| 4,085,839 | 4/1978 | Crawford | 198/416 |
| 4,144,363 | 3/1979 | Balloni et al. | 427/322 |
| 4,421,780 | 12/1983 | Buzio et al. | 427/299 |
| 4,421,781 | 12/1983 | Reznik | 118/620 |
| 4,465,715 | 8/1984 | Manabe et al. | 427/444 |

(List continued on next page.)

FOREIGN PATENT DOCUMENTS

| | | | |
|---|---|---|---|
| 3601908 | 7/1987 | Germany | 427/533 |
| 8208326 | 12/1983 | Japan | 427/535 X |

OTHER PUBLICATIONS

"Corona Sparks New Interest For Treating Large 3–D Parts", by Jan. H. Schut, Plastics Technology, Feb. 1993.
"What You Should Know About Bare-Roll Corona Treaters", by Steve Kaainoa, Plastics Technology, Feb. 1986.
TANTEC "The On-Line 3–D Surface Treatment Technology" brochure, Publication No. 0391A, No Date.
3DT "New Dimensions in Corona Treating" brochure, Publication No. 3DT 00192, No Date.
"Preparing Polyolefin Surfaces for Inks and Adhesives", by Ayres and Shofner, SPE Journal, vol. 28, No. Dec. 1972.
AEROGEN "Flame Plasma Treatment" brochure, The Areogen Company Limited, No Date.

*Primary Examiner*—Marianne Padgett
*Attorney, Agent, or Firm*—Lott & Friedland

[57] ABSTRACT

A method of and apparatus for treating a polyolefin surface to become receptive to inks and adhesives is disclosed. The present invention provides a method of and apparatus for treating a polyolefin surface to become receptive to inks and adhesives, using the steps of introducing the shaped object onto a conveyor belt; conveying the shaped object towards an output end of the conveyor belt; aligning and guiding the shaped object across a treatment device to treat the entire 360° surface of the shaped object. The treatment device includes, for example, an electrode spark generator.

16 Claims, 2 Drawing Sheets

U.S. PATENT DOCUMENTS

| | | | |
|---|---|---|---|
| 4,495,217 | 1/1985 | Schrum | 427/478 |
| 4,501,546 | 2/1985 | Valimont et al. | 156/574 |
| 4,567,106 | 1/1986 | Sano et al. | 427/223 |
| 4,664,978 | 5/1987 | Wu et al. | 427/302 |
| 4,702,760 | 10/1987 | Garcia de Leon | 427/479 |
| 4,717,516 | 1/1988 | Isaka et al. | 427/536 |
| 4,814,199 | 3/1989 | Boccalon et al. | 427/322 |
| 5,039,549 | 8/1991 | Nguyen et al. | 427/322 |
| 5,059,447 | 10/1991 | Katoh et al. | 427/322 |
| 5,077,082 | 12/1991 | Katoh et al. | 427/307 |
| 5,132,131 | 7/1992 | Katoh et al. | 427/412.3 |
| 5,183,509 | 2/1993 | Brown et al. | 118/500 |
| 5,320,877 | 6/1994 | Nakaue et al. | 427/242 |

METHOD AND APPARATUS FOR TREATING A POLYOLEFIN SURFACE TO OBTAIN AN ACTIVE SURFACE WHICH IS RECEPTIVE TO INKS AND ADHESIVES

TECHNICAL FIELD

This invention relates generally to a method of and apparatus for treating a polyolefin surface of a shaped object in order to obtain an active surface which is receptive to inks and adhesives, and this invention specifically relates to a method of and apparatus for treating a polyolefin surface of a three dimensional, substantially cylindrical shaped object in order to obtain an active surface which promotes adhesion, printability, and wetability comprising a conveyor mechanism in combination with an electrical discharge treatment device to activate the surface of the shaped object to become receptive to inks and adhesives.

BACKGROUND OF THE INVENTION

It is well known in the art that polyolefins are inherently inert and that a chemical change is required to obtain an active surface which is receptive to inks and adhesives. The surface of the object must be oxidized in order to provide a chemical bond. The oxidation of shaped objects can be accomplished by a variety of methods, including gas flame treatment, electronic spark discharge with opposing electrodes, chemical oxidation with various chemical compounds, and UV irradiation treatment. However, there are problems associated with each of these methods.

The gas flame treatment method is accomplished by exposing the surface of the shaped object to a gas flame. However, flame treatment may result in unsatisfactory surface treatment, since the surface is liable to be distorted, burned or melted by the flame. Another disadvantage arises in the expense associated with providing compressed air for combustion of the flame. Additionally, the use of gas flames causes a possible fire hazard. Flame treatment also generates heat and cannot be instantly turned on and off.

Electronic spark discharge treatment is carried out by passing the object to be treated through a tunnel within which a pair of opposing electrode plates are disposed. Ionized gases, also known as atmospheric or nonvaccuum plasmas or Coronas are created by the electricity passing through the air. A high AC voltage is impressed between the electrodes to effect spark discharge. An electric current flows through the surface of the object which is parallel with the direction of the spark discharges. This system is mainly used in treating films and flat objects since this method only treats the surfaces which are parallel to the direction of the discharge. An example of this method is shown in U.S. Pat. No. 3,484,363 to Williams incorporated herein by reference. Williams generally describes an electrical discharge treating apparatus designed to provide a plurality of uniform spark discharges, having a pair of electrodes spaced apart from each other within a tunnel through which plastic objects pass to be treated. A horizontally disposed pair of electrodes generate vertical sparks, and a pair of vertically disposed electrodes generate horizontal sparks to treat both the vertical and horizontal surfaces of the passing object. The disadvantage of the Williams apparatus is that the distance between the electrodes determines the maximum size of object which can be treated, and the larger the gap between the electrodes, the greater the electrical stresses. Another disadvantage is the fact that the apparatus requires a tunnel chamber and gaseous mixtures for suitable treatment.

Chemical oxidation can be accomplished by exposing the surface of the object to a low temperature plasma so that the surface undergoes a chemical change by the action of the oxygen and ultra violet rays, however this method requires very expensive apparatus and a sealed treatment chamber. Another treatment method is to immerse the shaped body into a chromic acid mixture, but immersion results in high costs for the treatment of the waste produced. Although the entire 360° surface area of the shaped object can be treated by immersion methods, these methods are costly and relatively slow.

UV irradiation requires contacting the surface with a UV ray-absorbing liquid by immersion or any suitable coating method such as spray coating, and then subjecting the object to UV irradiation treatment. Examples of UV irradiation treatment of shaped objects are generally illustrated in U.S. Pat. No. 5,077,082 to Katoh, et al. incorporated herein by reference. Katoh, et al. generally describes a method of treating the surface of a shaped body formed of polypropylene resin by first contacting the surface with a UV ray-absorbing liquid by immersion or any suitable coating method such as spray coating, and then subjecting the object to UV irradiation treatment using, for instance, a low or medium pressure mercury lamp. One major disadvantage of the system described in Katoh, et al. is that UV irradiation treatment requires a relatively long period of time in order to obtain the desired results. The same disadvantages as arise in immersion of the shaped object discussed above, such as expensive apparatus and the necessity of a sealed treatment chamber, also make this method undesirable.

Certain treatment methods are combined to provide greater results in the treatment of polymer surfaces. U.S. Pat. No. 5,059,447 to Katoh, et al. generally describes a method of treating the surface of a shaped body formed of a synthetic organic polymer by spark discharge treatment which is preceded and/or followed by a treatment with a UV ray-absorbing liquid and/or UV irradiation treatment. Although the combination method decreases the time required for the UV irradiation step, the entire treatment time is still relatively slow and unsuitable for high speed production lines.

One major disadvantage associated with treatment of shaped objects which require 360° of surface area to be treated, such as bottles, cylindrical containers or the like, is the difficulty in treating the entire 360° surface area in one step. Since manufacturers usually desire to label or print on all sides of the container, an economical and inexpensive method for treating the entire 360° surface area in one step is needed. The systems in use today effectively treat only the side of the shaped object which is parallel to the treatment means. Thus when treatment means such as flame, electronic discharge, UV lamp, or sprayer are used, the entire 360° surface area of the object is not fully treated. In order to obtain treatment of the entire 360° surface area of a shaped object, the object must be passed by the treatment means multiple times or there must be multiple treatment means set up along all sides of the object. Multiple treatments are unsuitable for industry use, due to reduction in the speed of production, excess time and energy use, and increased cost. Although chemical coating by complete immersion will treat the entire 360° surface area of the object, this method is not suitable for production line and is costly and inefficient.

One possible solution to these problems is to provide a system wherein the entire 360° surface area of the object is fully treated in one step.

Another possible solution to these problems is to provide a system wherein the treatment method is economical and requires a relatively short period of time in order to obtain the desired results, and can be adapted for use with existing high speed production lines.

Another possible solution to these problems is to provide a system wherein the treatment device which generates only a small amount of heat, and does not increase fire hazards.

Thus, there has been a need in the art for a system that provides treatment of the entire 360° surface area of the object in one step.

There is an additional need in the art for a system which is suitable and adaptable for industry use in high speed production lines.

There is an additional need in the art for a system which the treatment method requires a relatively short period of time in order to obtain the desired results.

There is an additional need in the art for a system in which does not require very expensive apparatus.

There is an additional need in the art for a system which the treatment device does not generate extreme amounts of heat, or increase fire hazards.

SUMMARY OF THE INVENTION

The present invention solves significant problems in the art by providing a method of and apparatus for treating a polyolefin surface to obtain an active surface receptive to inks and adhesives.

Generally described, the present invention provides a method for treating a polymer surface of a shaped object in order to obtain an active surface, including the steps of introducing the shaped object onto an intake end of a conveyor belt of an inclined conveyor mechanism, wherein said shaped object comprises two ends, and a substantially cylindrical body portion; conveying the shaped object in a direction of conveyance towards an output end of the conveyor belt; aligning the body portion of the shaped object alongside an operation side of the conveyor mechanism with the body portion oriented substantially parallel to the direction of conveyance; guiding the shaped object across a treatment device; treating the surface of the body portion of the shaped object; and discharging the shaped object from an output end of the conveyor belt.

The introduction step includes placing the shaped object on the intake end of the conveyor belt such that a surface of the body portion of the shaped object contacts a top face of the conveyor belt, whereby the shaped object travels in contact with the surface of the conveyor belt in the direction of conveyance.

The alignment step includes an alignment plate mounted near the intake end of the conveyor belt and slightly above the top face of the conveyor belt, the alignment plate extending from a distant side of the conveyor mechanism at a downward angle across the conveyor belt, terminating at a point approaching the operation side of the conveyor mechanism, whereby the alignment plate acts as a barrier, redirecting the shaped object alongside the operation side of the conveyor mechanism with the body portion of the shaped object oriented substantially parallel to the direction of conveyance.

The guiding step includes an adjustable guiding arm, the guiding arm redirecting the movement of the shaped object, at a predetermined angle, across the conveyor belt at a substantially constant distance from the treatment device, whereby friction between the body portion of the shaped object and the top face of the conveyor belt and the incline of the conveyor belt causes the shaped object to rotate along its lengthwise axis as the shaped object travels across the treatment device.

The treatment step includes a treatment device which oxidizes the surface of the body portion of the shaped object by means of an electrical discharge.

The method further comprises, prior to the discharging step, the step of counting each of the shaped objects.

The method further comprises, prior to the treatment step, the step of detecting fault in the treatment device.

The method further comprises, prior to the treatment step, the step of detecting the object, wherein the detection step comprises a sensor which detects the object and activates the treatment device.

The invention also provides an apparatus for treating a polymer surface of a shaped object in order to obtain an active surface, comprising means for introducing the shaped object onto an intake end of a conveyor belt of an inclined conveyor mechanism, wherein the shaped object comprises two ends, and a substantially cylindrical body portion; means for conveying the shaped object in a direction of conveyance towards an output end of the conveyor belt; means for aligning the body portion of the shaped object alongside an operation side of the conveyor mechanism with the body portion oriented substantially parallel to the direction of conveyance; means for guiding the shaped object across a treatment device; means for treating the surface of the body portion of the shaped object; and means for discharging the shaped object from an output end of the conveyor belt.

The means for introducing comprises means for placing the shaped object on the intake end of the conveyor belt such that a surface of the body portion of the shaped object contacts a top face of the conveyor belt, whereby the shaped object travels in contact with the surface of the conveyor belt in the direction of conveyance.

The means for aligning comprises an alignment plate mounted near the intake end of the conveyor belt and slightly above the top face of the conveyor belt, the alignment plate extending from a distant side of the conveyor mechanism at a downward angle across the conveyor belt, terminating at a point approaching the operation side of the conveyor mechanism, whereby the alignment plate acts as a barrier, redirecting the shaped object alongside the operation side of the conveyor mechanism with the body portion of the shaped object oriented substantially parallel to the direction of conveyance.

The means for guiding comprises an adjustable guiding arm, the guiding arm redirecting the movement of the shaped object, at a predetermined angle, across the conveyor belt at a substantially constant distance from the treatment device, whereby friction between the body portion of the shaped object and the top face of the conveyor belt and the incline of the conveyor belt causes the shaped object to rotate along its lengthwise axis as the shaped object travels across the treatment device.

The means for treating comprises a treatment device which oxidizes the surface of the body portion of the shaped object by means of an electrical discharge.

The apparatus further comprises, means for counting each of the shaped objects.

The apparatus further comprises, means for detecting fault in the treatment device.

The apparatus further comprises, a sensor which detects the object and activates the treatment device.

Accordingly, it is an object of the present invention to provide a system that treats the entire 360° surface area of the object in one step.

It is another object of the present invention to provide a system which is suitable and adaptable for industry use in high speed production lines.

It is another object of the present invention to provide a system in which the treatment method requires a relatively short period of time in order to obtain the desired results.

It is another object of the present invention to provide a system which does not require very expensive apparatus.

It is another object of the present invention to provide a system in which the treatment device does not generate extreme amounts of heat, or increase fire hazards.

Accordingly, it is a feature of the invention to provide a means for aligning the body portion of the shaped object alongside an operation side of the conveyor mechanism with the body portion oriented substantially parallel to the direction of conveyance.

It is another feature of the invention to provide a means for guiding the shaped object across a treatment device.

It is another feature of the invention to provide a means for treating the entire 360° surface of the body portion of the shaped object.

An advantage of the invention is the ability to treat the entire 360° surface of the body portion of the shaped object in one step.

These and other objects, features, and advantages of the present invention may be more clearly understood and appreciated from a review of the following detailed description of the disclosed embodiments and by reference to the appended drawings and claims.

BRIEF DESCRIPTION OF THE DRAWINGS FIGURES

DETAILED DESCRIPTION OF THE PREFERRED EMBODIMENT

Figure 1:
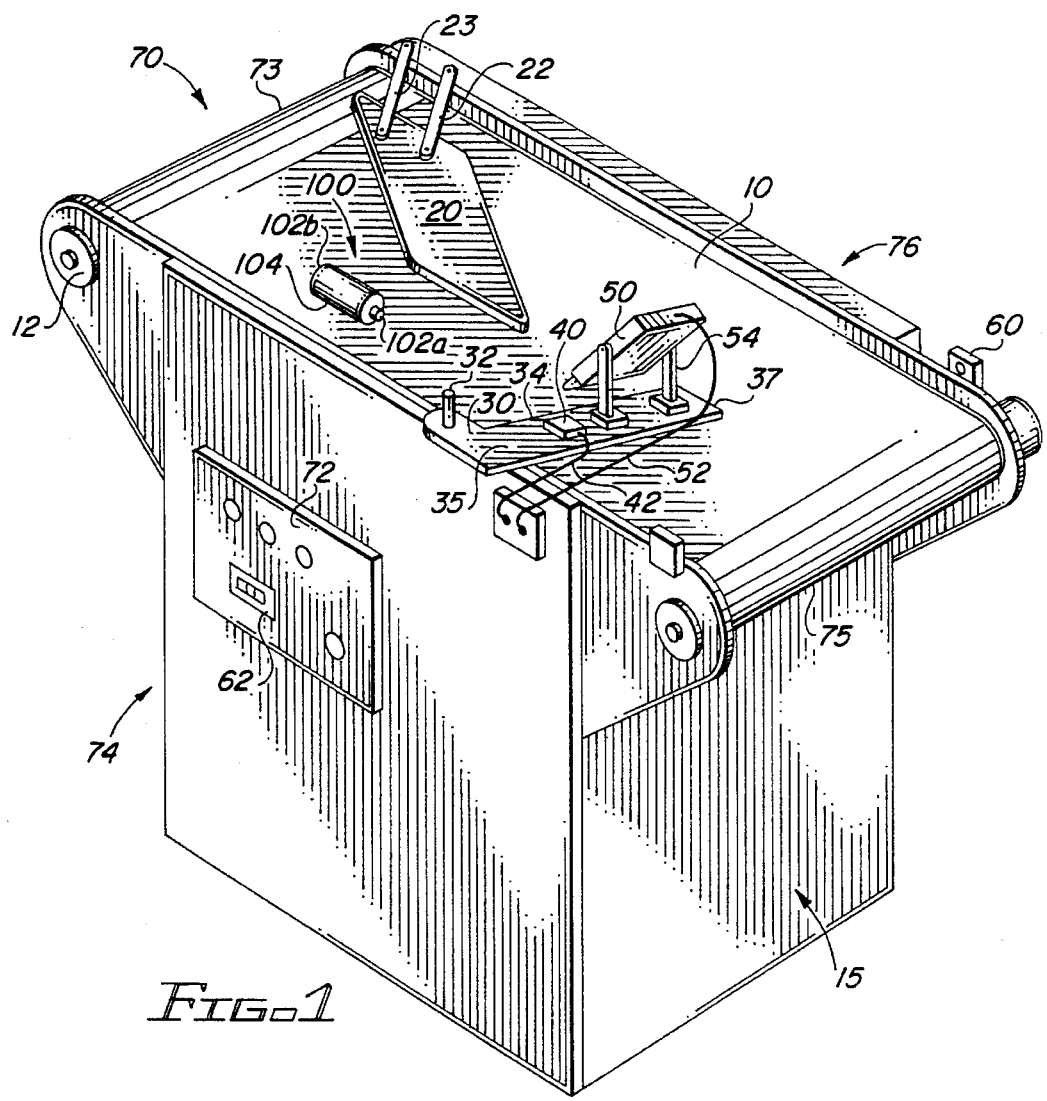
FIG. 1 is an elevated view of a preferred embodiment of the apparatus for treating a polyolefin surface.
Figure 2:
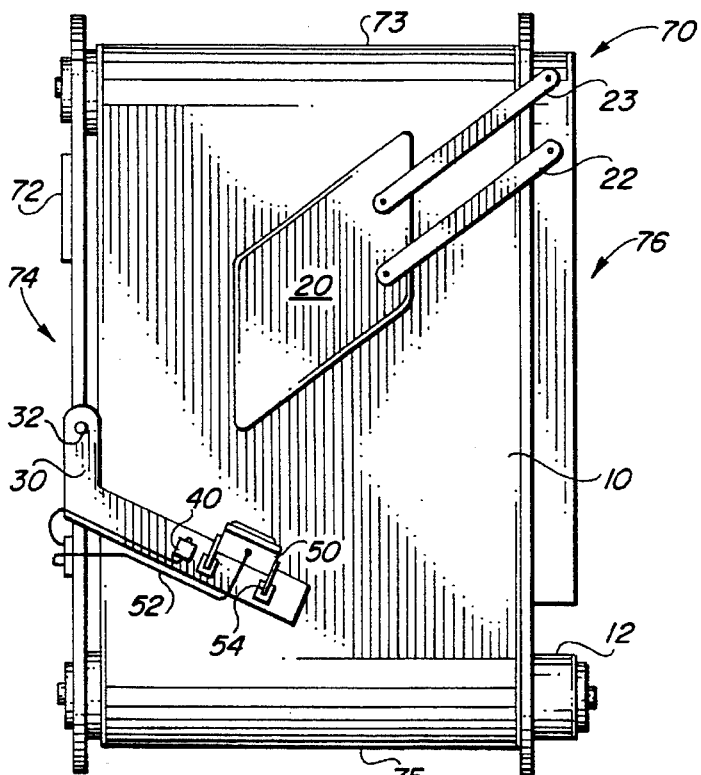
FIG. 2 is a top view of the preferred embodiment of the apparatus for treating a polyolefin surface according to the invention.

Referring initially to FIGS. 1 and 2 of the drawings, in which like numerals indicate like elements throughout the several views, in a preferred embodiment the surface treater of this invention is generally illustrated by reference numeral 70. The conveyor belt 10 is attached to a top portion of the conveyor mechanism 15 of the surface treater 70 by means of rollers 12 or the like, with a downward slope from the intake end 73 to the output end 75. A control panel 72 is located on the operation side 74 of the conveyor mechanism 15. The control panel 72 provides a main breaker to power the conveyor belt 10. A shaped object 100, having two ends 102a, 102b and a substantially cylindrical body portion 104, placed on the intake end 73 of the conveyor belt 10 will travel the length of the conveyor belt 10 and exit from the output end 75. The shaped object 100 is capable of rolling on its body portion 104 along its lengthwise axis.

An alignment plate 20 is positioned on a horizontal plane above the top surface of the conveyor belt 10 by two positioning arms 22, 23, each attached at one end to the alignment plate 20, and at the other end to a distant side 76 of the conveyor mechanism 15 near the intake end 73 of the conveyor belt 10. The alignment plate 20 extends approximately three quarters the way across the width of the conveyor belt 10, and acts as a barrier, leaving only a narrow path on the surface of the conveyor belt 10 along the operation side 74 of the conveyor mechanism 15 just wide enough for the traveling shaped object 100 to progress lengthwise. (A representation of this path is shown in greater detail in FIG. 3). The alignment plate 20 is positioned such that it obstructs the path of conveyance of a shaped object 100 not already traveling this narrow path, and is angled such that it funnels the shaped object 100 across the conveyor belt 10 toward the operation side 74 of the conveyor mechanism 15. This funneling action turns the shaped object 100 lengthwise causing one of the two ends 102a, 102b of the traveling shaped object 100 to lead in the direction of conveyance.

A guiding arm 30 is positioned on a horizontal plane above the top surface of the conveyor belt 10 toward the output end 75 of the conveyor mechanism 15. A first end 35 of the guiding arm 30 is rotatably attached to the operation side 74 the conveyor mechanism 15 by a bolt 32 or the like. The guiding arm 30 extends across the conveyor belt 10 at a downward angle, with the second end 37 of the guiding arm 30 terminating approximately half way across the width of the conveyor belt 10. The angle of the guiding arm 30 can be adjusted by rotating the guiding arm 30 around this point of attachment.

An electrical discharge apparatus 50 is mounted toward the second end 37 of the guiding arm 30 by a bracket 54. The electrical discharge apparatus 50 is attached to a power source by means of a cable 52 or the like. A sensor 40 is mounted between the electrical discharge apparatus 50 and the first end 35 of the guiding arm 30 to detect a passing shaped object 100 and signal activation of the electrical discharge apparatus 50. The electrical discharge apparatus 50 will remain activated to treat the passing shaped object 100. As long as the passing shaped object 100 is spaced at a short enough interval from the last shaped object 100 that passed, the electrical discharge apparatus 50 will remain active, and treat each of the shaped objects 100. However, longer intervals will cause the electrical discharge apparatus 50 to shut off until the next passing shaped object 100 is detected by the sensor 40, thereby saving energy during times of inactivity. The sensor 40 also detects any fault with the electrical discharge apparatus 50 and can signal a shut down of the surface treater 70 and signal an alarm. A counter 60 is mounted at the output end 75 of the conveyor mechanism 15 which can be set to track the number of treated shaped objects 100. A counter display device 62 is located on the control panel 72.

Figure 3:
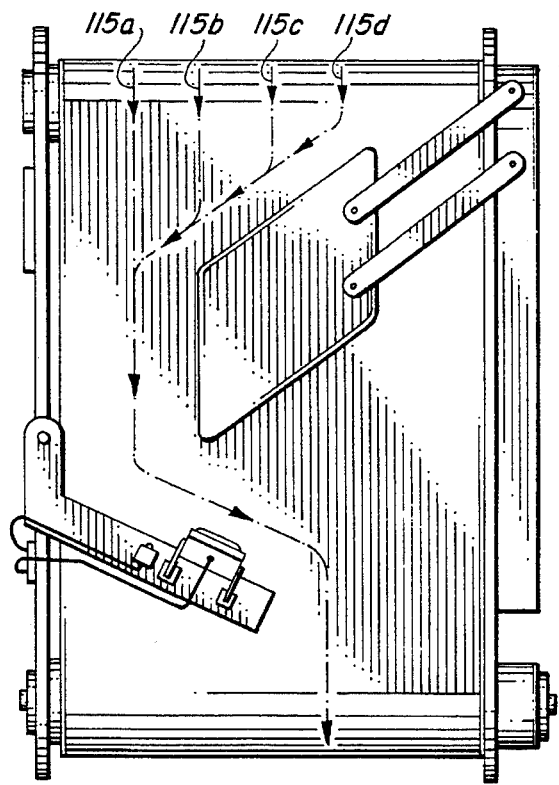
FIG. 3 is a top view of the preferred embodiment of the apparatus for treating a polyolefin surface illustrating with arrows a representation of the available paths of conveyance of the shaped objects.

The progression of a traveling shaped object 100 along the surface of the conveyor belt 15 is illustrated by the arrows shown in FIG. 3, which represent the paths 115a, 115b, 115c, and 115d along the conveyor belt 10 which a shaped object 100 is directed to travel due to the positions of the alignment plate 20 and the guiding arm 30. The progression of a traveling shaped object 100 along the surface of the conveyor belt 10 is as follows: The shaped object 100 to be treated is placed on the intake end 73 of the conveyor belt 10, either manually or automatically, receiving output from a production line, for example. As the shaped object 100 travels, if the shaped object 100 is not traveling the conveyor belt 10 along the operation side 74 of the conveyor mechanism 15 along path 115a, the alignment plate 20 will obstruct the path of the traveling shaped object 100 and funnel it toward the operation side 74 of the conveyor mechanism 15. Since the position of the alignment plate 20 only leaves a narrow path 115a on the conveyor belt 10 along the operation side 74 of the conveyor mechanism 15 available for the traveling shaped object 100 to progress, all objects 100 will be forced to traverse this path 115a. Since the path 115a is only wide enough to allow the shaped object 100 to pass lengthwise, one of the two ends 102a, 102b of the object 100 will be leading. As the object 100 continues to travel down the conveyor belt 10, a leading end 102a or 102b will come in contact with the guiding arm 30 which intersects this narrow path 115a of the conveyor belt 10. Because the conveyor belt 10 is sloped, the object 100 will contact the guiding arm 30 and travel across the width of the conveyor belt 10 at the same angle as the guiding arm 30, with the body portion 104 of the object 100 abutting the edge 34 of the guiding arm 30. As the object 100 is gliding down the angled guiding arm 30, the friction of the moving conveyor belt 10 underneath the body portion 104 of the object 100 will cause the object 100 to rotate on a lengthwise axis parallel to the guiding arm 30. When the object 100 passes the sensor 40, the electrical discharge apparatus 50 will be activated and it will generate an electrical discharge. As the object 100 passes the electrical discharge apparatus 50, it will be rotating along its lengthwise axis, and the entire 360° surface of the body portion 104 of the object 100 will be treated.

Figure 4:
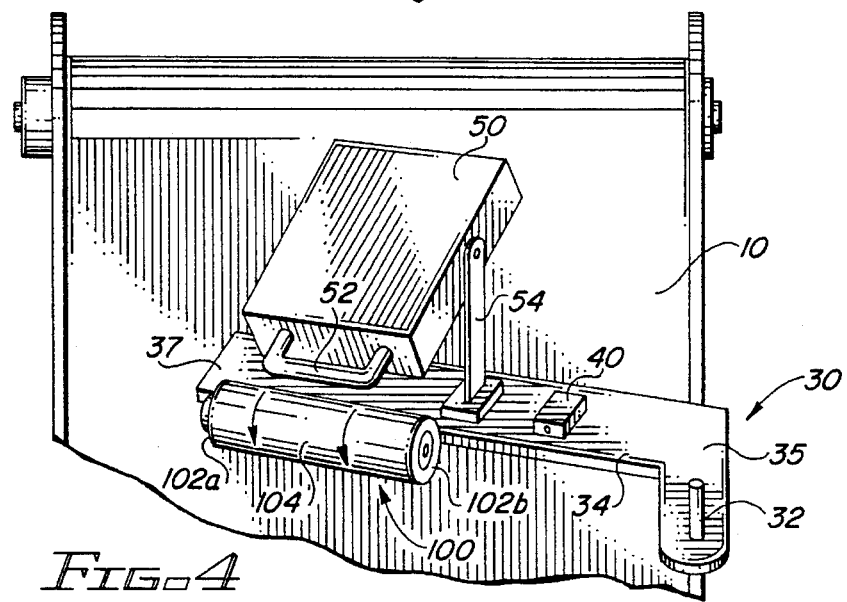
FIG. 4 is an exploded view of the treatment means of the preferred embodiment of the apparatus for treating a polyolefin surface as a shaped object is being conveyed through the treatment area.

FIG. 4 shows an exploded view of the electrical discharge apparatus 50 of the preferred embodiment of the apparatus for treating a polyolefin surface as a shaped object 100 is being conveyed through the treatment area. The electrical discharge apparatus 50 is mounted to the guiding arm 30 by a bracket 54. The electrical discharge apparatus 50 is positioned such that the electrode 52 which generates the electrical discharge is parallel with the edge 34 of the guiding arm 30. After the sensor 40 detects the object 100 and signals the electrical discharge apparatus 50, the electrical discharge apparatus 50 is activated. The electrode 52 emits an electrical discharge into the air substantially near the surface of the electrode 52. As the object 100 travels across the width of the conveyor belt 10 in contact with the edge 34 of the guiding arm 30, the object 100 passes substantially near the surface of the electrode 52 within the range of the electrical discharge. Because the object 100 is rotating along its lengthwise axis as it passes the electrode, the entire 360° surface area of the body portion 104 of the object 100 will be oxidized. The conveyor belt 10 carries the object 100 past the treatment area and transports the treated object 100 to the output end 75 of the conveyor mechanism 15.

Accordingly, it will be understood that the preferred embodiment and alternative embodiment of the present invention have been disclosed by way of example and that other modifications and alterations may occur to those skilled in the art without departing from the scope and spirit of the appended claims.

What is claimed is:

1. A method for treating a polymer surface of a shaped object in order to obtain an active surface which is receptive to inks and adhesives, comprising the steps of:

introducing said shaped object onto an intake end of a moving conveyor belt of a conveyor mechanism inclining downward from said intake end, wherein said shaped object comprises two ends, and a substantially cylindrical body portion having said polymer surface thereon;

conveying said shaped object in a direction of conveyance towards an output end of said conveyor belt;

aligning said body portion of said shaped object alongside an operation side of said conveyor mechanism with said body portion oriented substantially parallel to said direction of conveyance;

guiding said shaped object across a treatment device, wherein said guiding step comprises realigning said object to cause conveyance across said conveyor belt at a substantially constant distance from said treatment device with an adjustable guiding arm, rotating said shaped object along its lengthwise axis as said shaped object travels across said treatment device at a speed automatically controlled by said moving conveyor belt such that all sides of said cylindrical body pass said treatment device at a substantially constant distance, whereby said rotating is caused by friction between said body portion of said shaped object and a top face of said conveyor belt and said incline of said conveyor belt;

treating said surface of said body portion of said shaped object by oxidizing said surface of said body portion of said shaped object with said treatment device to obtain said active surface; and discharging said shaped object from said output end of said conveyor belt.

2. The method of claim 1, wherein said introduction step comprises placing said shaped object on said intake end of said conveyor belt such that a surface of said body portion of said shaped object contacts a top face of said conveyor belt, whereby said shaped object travels in contact with said surface of said conveyor belt in said direction of conveyance.

3. The method of claim 1, wherein said alignment step comprises an alignment plate mounted near said intake end of said conveyor belt and slightly above said top face of said conveyor belt, said alignment plate extending from a distant side of said conveyor mechanism at a downward angle across said conveyor belt, terminating at a point approaching said operation side of said conveyor mechanism, whereby said alignment plate acts as a barrier, redirecting said shaped object alongside said operation side of said conveyor mechanism with said body portion of said shaped object oriented substantially parallel to said direction of conveyance.

4. The method of claim 1, wherein said treatment step comprises oxidizing said surface of said body portion of said shaped object by means of an electrical discharge from said treatment device.

5. The method of claim 1, further comprising, prior to said discharging step, a step of counting said shaped object.

6. The method of claim 5, further comprising, prior to said treatment step, a step of detecting fault in said treatment device.

7. The method of claim 5, further comprising, prior to said treatment step, a step of detecting said object, wherein said detection step comprises a sensor which detects said object and activates said treatment device.

8. A method for treating a polymer surface of a shaped object in order to obtain an active surface which is receptive to inks and adhesives, comprising the steps of:

introducing said shaped object onto an intake end of a conveyor belt of a conveyor mechanism inclining downward from said intake end, wherein said shaped object comprises two ends, and a substantially cylindrical body portion;

conveying said shaped object in a direction of conveyance towards an output end of said conveyor belt;

aligning said body portion of said shaped object alongside an operation side of said conveyor mechanism with said body portion oriented substantially parallel to said direction of conveyance;

guiding said shaped object across a treatment device, wherein said guiding step comprises realigning said object to cause conveyance across said conveyor belt at a substantially constant distance from said treatment device with an adjustable guiding arm;

rotating said shaped object along its lengthwise axis as said shaped object travels across said treatment device such that all sides of said cylindrical body pass said treatment device at a substantially constant distance;

treating said surface of said body portion of said shaped object by oxidizing said surface of said body portion of said shaped object with said treatment device to obtain said active surface; and discharging said shaped object from said output end of said conveyor belt.

9. The method of claim 8, wherein said treatment step comprises oxidizing said surface of said body portion of said shaped object by means of an electrical discharge from said treatment device.

10. The method of claim 8, further comprising, prior to said discharging step, a step of counting said shaped object.

11. The method of claim 8, further comprising, prior to said treatment step, a step of detecting fault in said treatment device.

12. The method of claim 8, further comprising, prior to said treatment step, a step of detecting said object, wherein said detection step comprises a sensor which detects said object and activates said treatment device.

13. A method for treating a polymer surface of a shaped object in order to obtain an active surface, comprising the steps of:

introducing said shaped object onto an intake end of a moving conveyor belt of a conveyor mechanism inclining downward from said intake end, wherein said shaped object comprises two ends, and a substantially cylindrical body portion having said polymer surface thereon;

conveying said shaped object in a direction of conveyance towards an output end of said conveyor belt;

aligning said body portion of said shaped object alongside an operation side of said conveyor mechanism with said body portion oriented substantially parallel to said direction of conveyance;

guiding said shaped object across a treatment device, wherein said guiding step comprises realigning said object to cause conveyance across said conveyor belt at a substantially constant distance from said treatment device with an adjustable guiding arm, rotating said shaped object along its lengthwise axis as said shaped object travels across said treatment device such that all sides of said cylindrical body pass said treatment device at a substantially constant distance, whereby said rotating is caused by friction between said body portion of said shaped object and a top face of said conveyor belt and said incline of said conveyor belt;

treating said surface of said body portion of said shaped object by oxidizing said surface of said body portion of said shaped object by means of an electrical discharge from said treatment device to obtain said active surface;

discharging said shaped object from said output end of said conveyor belt.

14. The method of claim 13, further comprising, prior to said discharging step, a step of counting said shaped object.

15. The method of claim 13, further comprising, prior to said treatment step, a step of detecting fault in said treatment device.

16. The method of claim 13, further comprising, prior to said treatment step, a step of detecting said object, wherein said detection step comprises a sensor which detects said object and activates said treatment device.

* * * * *